United States Patent [19]

Kaiser

[11] Patent Number: 5,526,645
[45] Date of Patent: Jun. 18, 1996

[54] DUAL-FUEL AND SPARK IGNITED GAS INTERNAL COMBUSTION ENGINE EXCESS AIR CONTROL SYSTEM AND METHOD

[75] Inventor: Robert M. Kaiser, Napa, Calif.

[73] Assignee: Powerhouse Diesel Services, Inc., American Canyon, Calif.

[21] Appl. No.: 506,903

[22] Filed: Jul. 26, 1995

[51] Int. Cl.⁶ ............................................. F02D 23/02
[52] U.S. Cl. .................................... 60/611; 123/564
[58] Field of Search ....................... 60/603, 611; 123/564

[56] References Cited

U.S. PATENT DOCUMENTS

| | | | |
|---|---|---|---|
| 4,603,674 | 8/1986 | Tanaka | 60/611 |
| 4,849,897 | 7/1989 | Ciccarone | 60/611 |
| 4,873,961 | 10/1989 | Tanaka | 123/564 |
| 5,454,360 | 10/1995 | Shimizu et al. | 123/564 |

*Primary Examiner*—Michael Koczo
*Attorney, Agent, or Firm*—Baker & Botts

[57] ABSTRACT

An excess air control system and method (10) for a dual-fuel or spark ignition gas internal combustion engine (12) is provided. The controller (18) senses the exhaust temperature, senses the air manifold temperature, senses the air manifold pressure, and measures the engine power output of the engine (12). Based on these measurements and engine characterization data, a target air manifold pressure is computed. The target air manifold pressure is compared with the sensed air manifold pressure, and an air blowoff valve coupled to an air bypass line linking the air intake to the turbocharger (36) and the air manifold (40) is either opened or closed to achieve the target air manifold pressure.

36 Claims, 7 Drawing Sheets

DUAL-FUEL AND SPARK IGNITED GAS INTERNAL COMBUSTION ENGINE EXCESS AIR CONTROL SYSTEM AND METHOD

TECHNICAL FIELD OF THE INVENTION

This invention is related in general to the field of gaseous fueled internal combustion engines. More particularly, the invention is related to dual-fuel and spark ignited gas internal combustion engine excess air control system and method.

BACKGROUND OF THE INVENTION—DUAL FUEL

A dual-fuel internal combustion engine is an engine which can operate as a full diesel cycle engine in which combustion is by compression ignition, or as an Otto cycle natural gas engine in which combustion is started through the compression ignition of a small quantity of liquid diesel fuel injected into the compressed gas-air mixture. Therefore, a dual-fuel engine is a gas-fuel burning engine in which the gaseous fuel-air mixture is ignited through the compression ignition of liquid diesel fuel instead of ignition with spark plugs as in a spark ignited gas fueled engine. As a result, the dual fuel engine must be capable of operating in two entirely different modes.

In the diesel fuel mode of operation, combustion occurs in an "in situ" process, where each droplet of diesel fuel is a potential ignition source. It is essential to provide the injected fuel with sufficient oxygen to enable all the fuel droplets to fully ignite to achieve maximum combustion efficiency. A deficiency of oxygen will lead to incomplete combustion, resulting in a loss of combustion efficiency, higher thermal loads, and excessive exhaust smoke. For this reason, it is preferable to supply a diesel engine with as much air as is practicable in order to maximize operating efficiency and combustion stability. For all practical purposes, and with engine structure limitations, the diesel power cycle has no upper limit on the amount of air used for combustion. Therefore, once minimum levels have been established, the term air/fuel ratio for a diesel engine is essentially inappropriate and has little meaning.

A natural gas burning engine, on the other hand, has very different requirements. In the gas burning process, combustion is completed through flame front progression across the face of the combustion chamber. This process relies almost entirely on the interfacing of hot burning flame front gases igniting the yet unburned portion of the gas-air mixture. Thus, if the flame front progression across the combustion chamber were interrupted for any reason, the balance of the fuel-air mixture would remain unaffected, and an incomplete Combustion cycle would occur.

A partially incomplete combustion cycle is nowhere as dangerous as a complete combustion failure, commonly termed a "misfire." If misfire occurs with sufficient frequency and in a sufficient number of power cylinders, an accumulation of unburned gas-fuel mixture may "load up" in the exhaust system. If the unburned gas-fuel mixture were inadvertently ignited, an exhaust explosion would occur which could have sufficient force to split the exhaust muffler from top to bottom. Since the nature of combustion in a gas-fired engine is so heavily dependent on the air-to-fuel ratio, complete combustion failure can occur from an excess supply of combustion air or "lean misfire," to combustion failure due to a deficiency of combustion air or "rich misfire." Both lean and rich misfire conditions are undesirable and unsafe. An even more threatening problem to the engine structure is "detonation," in which a supersonic combustion shock wave is created by auto ignition of the unburned portion of the gas charge. Unchecked severe detonation is capable of destroying an engine.

Accordingly, unlike the full diesel engine, combustion air control in a natural gas internal combustion engine is critical for the success and safety of engine operation. In a dual-fuel internal combustion engine, it becomes imperative that maximum, unrestricted combustion air supply is available when the engine is operating in the full diesel mode, and that combustion air supply be modulated when operating in the dual-fuel or gas fuel mode.

Conventional combustion air control systems which regulate the air/fuel ratio have been available. Through the years, many approaches have been used to devise systems suitable to modulate the air supplied for gas combustion. An almost universal approach in the conventional systems is to gauge the flow of fuel gas being supplied to the engine, and then modulate the flow of combustion air to achieve the target air-fuel conditions.

There are several definitions of the term "air/fuel ratio." Some of the definitions are listed in the following table:

| | |
|---|---|
| Weight basis Air/Fuel Ratio | LBW/LBW |
| Weight Flow basis Air/Fuel Ratio | (LBW/HR)/(LBW/HR) |
| Volume basis Air/Fuel Ratio | FT$^3$/FT$^3$ |
| Actual Volume Flow basis Air/Fuel Ratio | ACFH/ACFH |
| Standard Vol. Flow basis Air/Fuel Ratio | SCFH/SCFH |
| Mass Flow basis Air/Fuel Ratio | (LBM/HR)/(LBM/HR) |
| Total Air/Total Fuel Ratio | VOLUME, MASS |
| Stoichiometric Air/Fuel Ratio | VOL/VOL, LBM/LBM |
| Excess Air/Fuel Ratio | VOL/VOL, LBM/LBM |
| Gage Pressure basis Air/Fuel Ratio | PSIG/PSIG |
| Absolute Pressure basis Air/Fuel Ratio | PSIA/PSIA |
| Trapped Air/Fuel Ratio | VOL/VOL, LBM/LBM |

In order to discuss air/fuel ratio with some degree of confidence one needs to know the specific basis for the discussion. Because of the many forms of "air/fuel ratio," a casual discussion or decision can have serious downside effects. For instance, the weight basis air/fuel ratio for Methane ($CH_4$) is 17.22 pounds of air for each pound of Methane. However, on a volume basis, one cubic foot ($FT^3$) of Methane requires 9.54 $FT^3$ of air. The difference is found in the molecular weight differences between methane and air.

To further complicate the discussion, the stoichiometric air/fuel ratio, also known as the chemically correct air/fuel ratio, cannot be run on a turbo charged engine because of the high overlap scavenging required for combustion chamber cooling. An attempt to use the stoichiometric air/fuel ratio on a turbo charged engine may cause thermal destruction of the engine.

Other less obvious but equally troublesome air/fuel ratio applications include the pressure basis air/fuel ratio. With this concept, the gas fuel header pressure is measured and the manifold air pressure is balanced against the fuel gas pressure. While this is a common method of controlling a gas engine, some operating conditions may severely and irreversibly upset this air/fuel balance. The conventional force balance opposing diaphragm cross link-connected arrangement is one example of this system. Some inherent problems with the pressure basis air/fuel ratio includes the temperature of the gas and air media. In other words, if the control device is set up for a given set of conditions, changing those conditions will change the response characteristic of the controller.

An analogy of this problem is a gallon bucket filled to the brim with water at 60° F. The water line will be exactly even with the bucket top rim. Now raise the water temperature by heating the bucket with a torch to a temperature of 100° F. The thermal expansion of the water will cause some of the water to spill over the bucket sides When cooled back to 60° F., the water that spilled onto the floor will not return to the bucket but will remain on the floor. The bucket now contains less water and the water line will be substantially below the bucket rim.

The same situation takes place with a gas, but the effect is amplified because heat energy (BTU) is involved. If an engine is set up to run satisfactorily with fuel gas at, for example, 60° F., the horsepower flowing to the engine in the form of fuel gas energy will be sufficient to balance the horsepower required by the driven equipment and heat rejection loads. Under these conditions one cubic foot of fuel gas will contain a certain heat content or heating value expressed as $BTU/FT^3$.

Heating the fuel gas to 100° F., for example, causes some of the fuel gas to "spill out" of the standard cubic foot. If the fuel gas were cooled back to 60° F., by the water bucket analogy, there would be less gas in the standard cubic foot. Therefore, although a cubic foot would still measure a cubic foot at the higher fuel gas temperature there would actually be 7% fewer BTUs available. Because of the higher fuel gas temperature and lower heat energy per cubic foot, there would not be sufficient energy input to the engine to satisfy the load and heat rejection requirements. As a result the engine will lose output power evidenced by a drop in RPM, torque or both. The only way to get more heat energy to the engine with the higher gas temperature is to "pack" more gas into the already "full" cubic foot. This additional "packing" will raise the pressure inside the cubic foot. In an actual engine, the result will be an increase in the fuel gas header pressure only to regain the energy lost due to fuel gas heating. No additional output horsepower will be experienced. The specific heat input to the engine, BTU/HP-HR will be essentially constant, the only difference being the increased pressure in the fuel gas header. If the air control device were to ignore the fuel gas pressure, no effect would be seen in engine performance evidenced by exhaust temperatures, power output, etc.

However, an engine air control device using fuel gas pressure as a set point will see the change in fuel gas pressure caused by the change in fuel gas temperature, and will correct the air supplied to the engine based on this apparent change in engine load when, in fact, the engine load did not change. The result may be an engine pulling the same load with detonating cylinders because of lower combustion air supply brought on by cooler gas or a kilowatt meter cycling wildly, because of an excess of combustion air caused by higher fuel gas temperature, in all cases, because the air supplied to the engine is tied to the fuel gas header pressure. Similar conditions would be experienced with a controller using governor position as a set point, because the engine governor controls the fuel gas flow control valve and the fuel gas header pressure. A combustion air control device which senses fuel gas header pressure as a basis for engine air control level is further disproportioned when normal maintenance is practiced on the engine. Adjusting the individual cylinder fuel gas supply will affect the gas header pressure overall, which will therefore affect engine air supply in a manner similar to fuel gas temperature effects.

Controlling a gas fired engine on the basis of air/fuel ratio alone will not produce the results expected. Better success might be expected if the air/fuel ratio at the spark plug or at the fuel injector were sampled at ignition time. Hardware unavailability prevents this type sampling on a routine, cost effective, and continuous basis with current technology. Furthermore, scavenging requirements would not be addressed with this technique.

Even exhaust gas oxygen sampling, although routinely used in the non-supercharged or naturally aspirated engines, is not suitable for the turbo charged engine with high overlap periods. With the scavenging part of the power cycle spanning nearly 20% of the cycle time, free unreacted oxygen levels in the range of 10 to 12% make micro-controlling difficult.

A departure from the classical "measure gas, and then set air" method of modulating combustion air supply involves inferring the optimum air fuel ratio by "looking back" at the engine's exhaust gas outlet temperature. It has been found that when properly proportioned, the optimum or near optimum air/fuel ratio results in a nearly constant engine exhaust outlet temperature, regardless of load. While this approach provides some definite advantages in system simplicity, it also requires near constant "before engine" input conditions. There are some situations where unwanted effects are produced. One example is where a change in combustion air temperature can cause a reverse exhaust temperature effect because of the nature of gas fuel combustion. In other words, for a given combustion air density, defined in terms of air manifold temperature and pressure, the lowering of the air manifold temperature will provide greater air density than the reference condition. Because an increase in air density causes a retardation in the rate of gaseous fuel combustion, the exhaust or combustion discharge temperature will show an increase. This increase in exhaust temperature would cause the control device to supply a greater supply of combustion air to cool the exhaust temperature down, resulting in a further increase in the combustion air density. Therefore, the result in engine air control is opposite from that desired.

In addition to the effects of air manifold temperature on air charge density is the effect of fuel transfer from the diesel mode to the dual-fuel or gas fuel mode. While operating in the diesel mode, all air bypass valves intended to modulate combustion air flow are fully closed in order to provide maximum air to the diesel power cycle. In this condition, the exhaust temperature is at the lowest setting for any given engine load. When the engine is transferred to dual-fuel operation, the conventional exhaust temperature based control system is activated and an exhaust temperature set point is established. This exhaust temperature set point is almost always higher than the diesel exhaust temperature. Because of the sometimes large difference between diesel exhaust temperature and dual-fuel exhaust temperature, the conventional exhaust temperature based air control system acts to restrict air flow to the engine to attempt to raise the exhaust temperature to the dual-fuel set point. This action invariably causes a reduction in air supply, sometimes low enough to drive the gas combustion process into detonation, which if left unchecked could damage the engine.

The diesel to dual-fuel transfer problem cannot be as easily addressed with a biasing approach because of the uncertainty of fuel transfer duration or transfer times. Attempts have been made to lock out control for some time before enabling the controller, but this is still a disadvantageous "feed forward" approach.

SUMMARY OF THE INVENTION

Accordingly, there is a need for a combustion air controller which optimally controls an internal combustion engine capable of switching between a diesel operating mode and a dual-fuel operating mode. Due to the inherent problems and disadvantages of the various conventional air/fuel control systems, the conventional air/fuel approach is abandoned and fuel flow is totally disregarded. The present invention is applicable to any spark ignited, dual-fuel, naturally aspirated, supercharged or turbo charged gaseous fueled engine.

In accordance with the present invention, the dual-fuel internal combustion engine control system and method are provided which eliminate or substantially reduce the disadvantages associated with prior engine control systems.

In one aspect of the invention, an excess air control system includes a temperature sensor mounted in the exhaust line of the engine for sensing exhaust temperature, another temperature sensor mounted in the air manifold of the engine for sensing air manifold temperature, a pressure sensor also mounted in the air manifold for sensing air manifold pressure, and a transducer mounted on the engine for sensing engine power output. An air bypass line is coupled between the air manifold and the air intake of the turbocharger, with a valve assembly used to permit or prohibit air to escape from the air bypass line. A microprocessor-based controller receives the sensed engine parameters, calculates a target air manifold pressure and compares the target air manifold pressure with the measured air manifold pressure. The air control valve assembly is controlled in response to the comparison between the two pressure values.

In another aspect of the invention, a method for controlling a dual-fuel internal combustion engine is provided. Several engine parameters are sensed, including exhaust temperature, air manifold temperature, air manifold pressure, and engine power output. Then a target air manifold pressure AMP is computed by:

$$AMP = \frac{S}{A \times B \times AMT \times E} - SBP$$

where S is a specific engine air flow, A is an air manifold pressure conversion factor, B is an engine constant, AMT is said sensed air manifold temperature, E is an exhaust oxygen level, and SBP is the site barometric pressure. The target air manifold pressure is compared with the sensed air manifold pressure, and the air blowoff valve coupled to the air manifold is either opened or closed to achieve the target air manifold pressure.

In yet another aspect of the invention, the equation used to compute the target air manifold pressure is:

$$AMP = \frac{S}{(LOG\ AMP \times 0.1521 + 0.6514) \times B \times AMT \times E} - SBP$$

where S is a specific engine air flow, B is an engine constant, AMT is the sensed air manifold temperature E is an exhaust oxygen level and SBP is the site barometric pressure.

BRIEF DESCRIPTION OF THE DRAWINGS

For a better understanding of the present invention, reference may be made to the accompanying drawings, in which.

DETAILED DESCRIPTION OF THE INVENTION

Figure 1:
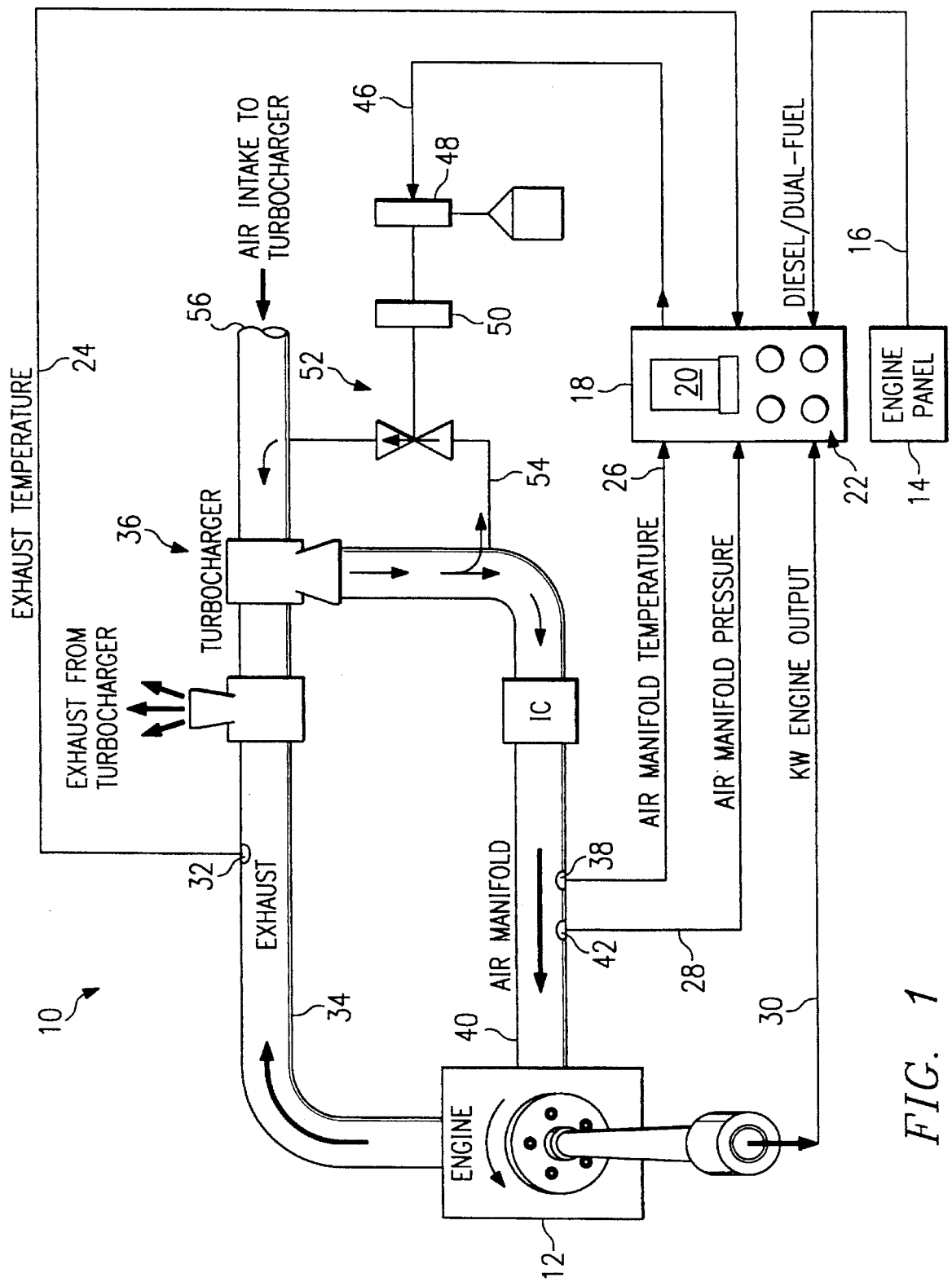
FIG. 1 is a schematic block diagram of the dual-fuel engine air control system and method constructed according to the present invention.

Referring to FIG. 1, an engine excess air control system 10 for controlling spark ignited gas or a dual-fuel internal combustion engine or generator 12 constructed according to the present invention is shown. Dual-fuel internal combustion engine 12 can operate as a full diesel cycle engine in which combustion is by compression ignition, or as an Otto cycle natural gas engine in which combustion is started through the compression ignition of a small quantity of liquid diesel fuel injected into the compressed gas-air mixture. The operation mode, diesel or dual-fuel, is preferably indicated by operator input at an engine panel 14. The operating mode 16 is then relayed to a microprocessor-based controller 18 in which the control process is carried out. Controller 18 preferably includes an output screen 20 and indicator lights 22 for displaying operating status, control status, engine operating mode, and other information. Controller 18 may be implemented, for example, by a Bailey Strategic Loop Command Controller, model SLC01 or SLC21, made by Bailey Controls of Wickliffe, Ohio. The Bailey Strategic Loop Command Controller logic consists of a number of function blocks which may be assigned logical or mathematical functions, operators and operands. The function blocks can be linked to form a process flow.

Controller 18 receives four other inputs: the exhaust temperature 24, air manifold temperature 26, air manifold pressure 28, and engine output 30. The exhaust temperature input 24 is measured by a sensor 32 such as a thermocouple located in the exhaust line 34 from engine 12 and leading to a turbocharger 36. The air manifold temperature 26 is also sensed by a thermocouple 38 mounted in engine air manifold 40 leading from turbocharger 36 to engine 12. The air manifold pressure 28 is measured by a pressure sensor and transmitter 42, also located in air manifold 40. The engine output 30 may use an AC watts transducer to sense and determine the kilowatt output of engine 12 from a generator (not shown) driven by engine 12.

From these input signals, controller 18 generates an output signal 46 to control a pneumatic actuator 48 with approximately 80 PSI of control air supply, for example, which actuates and controls the opening and closing of a blowoff valve 50 and to regulate the position of a butterfly bypass valve assembly 52. The butterfly bypass valve assembly 52 is coupled in-line with a bypass air piping 54, which allows air to escape from air manifold 40 to an air intake 56 of turbocharger 36. Therefore, closing blowoff valve 50 raises air manifold pressure and opening blowoff valve 50 lowers air manifold pressure.

Figure 2:
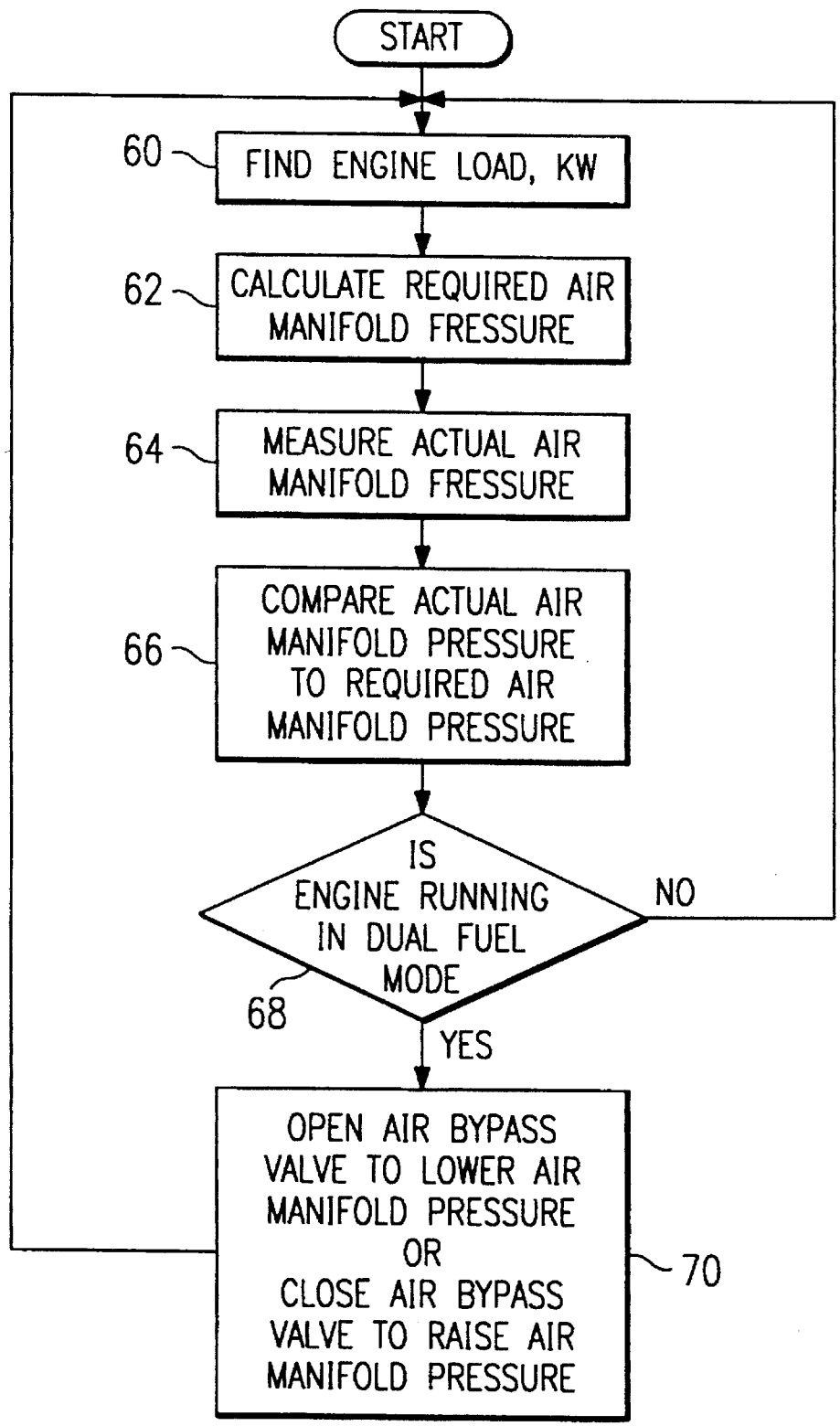
FIG. 2 is a top level flowchart of the air control process according to the present invention.

Referring to the top level flowchart in FIG. 2, controller 18 first receives the engine output or load expressed in kilowatts (KW), as shown in block 60, and then computes a required air manifold pressure 62 from the engine output in block 62. Controller 18 then receives the measured or actual air manifold pressure and compares it with the computed required air manifold pressure, as shown in blocks 64 and 66. If engine 12 is operating in dual-fuel mode, as determined in block 68, then controller 18 generates an output to control blowoff valve 50 to either open it to lower the air manifold pressure, or close it to increase the air manifold pressure, as shown in block 70. Otherwise if engine is operating in diesel fuel-only mode, nothing is changed and controller 18 loops back to the beginning of the process at block 60.

Figure 3:
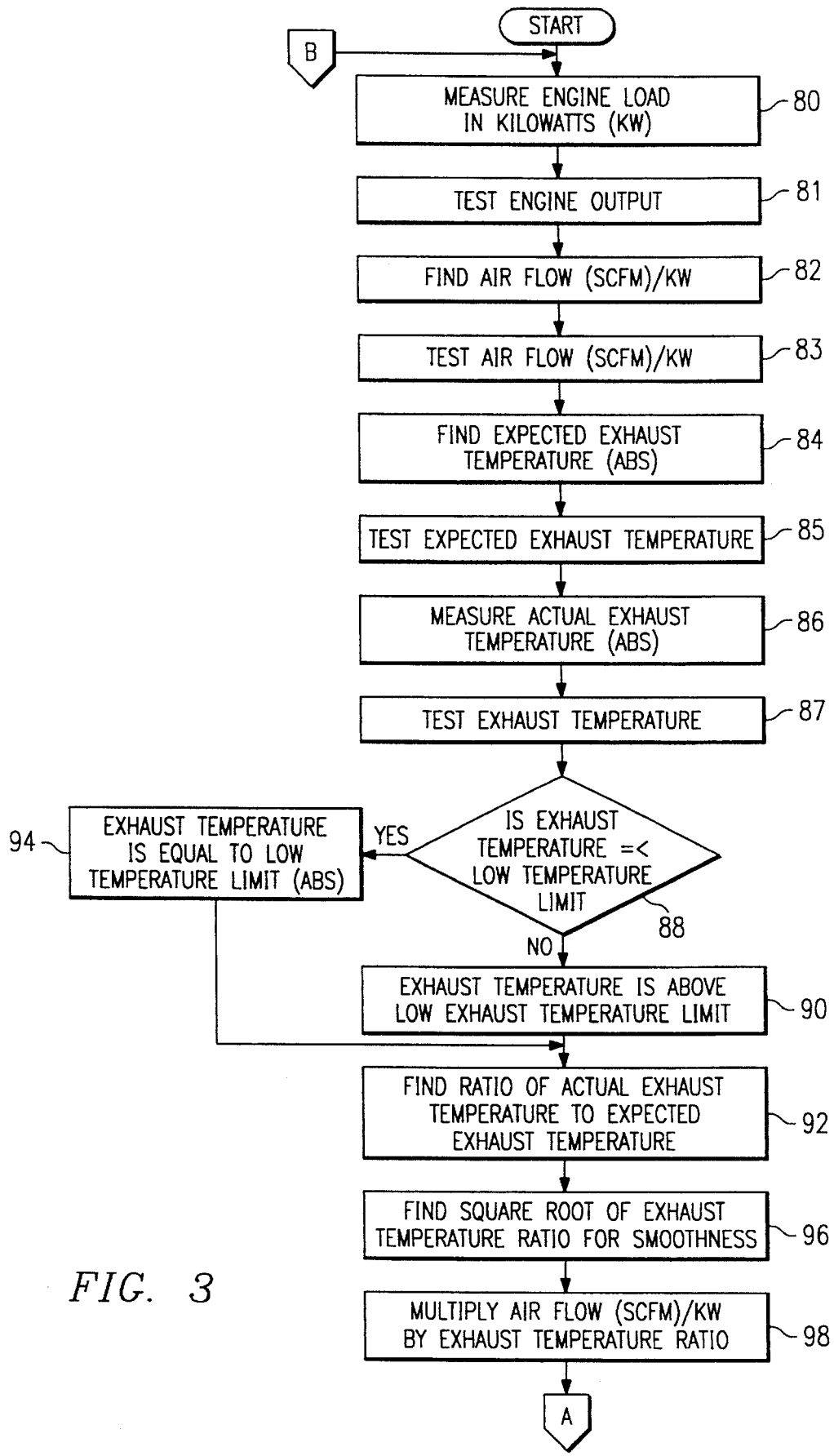
FIG. 3 is a portion of a more detailed flowchart of the air control process according to the present invention.
Figure 4:
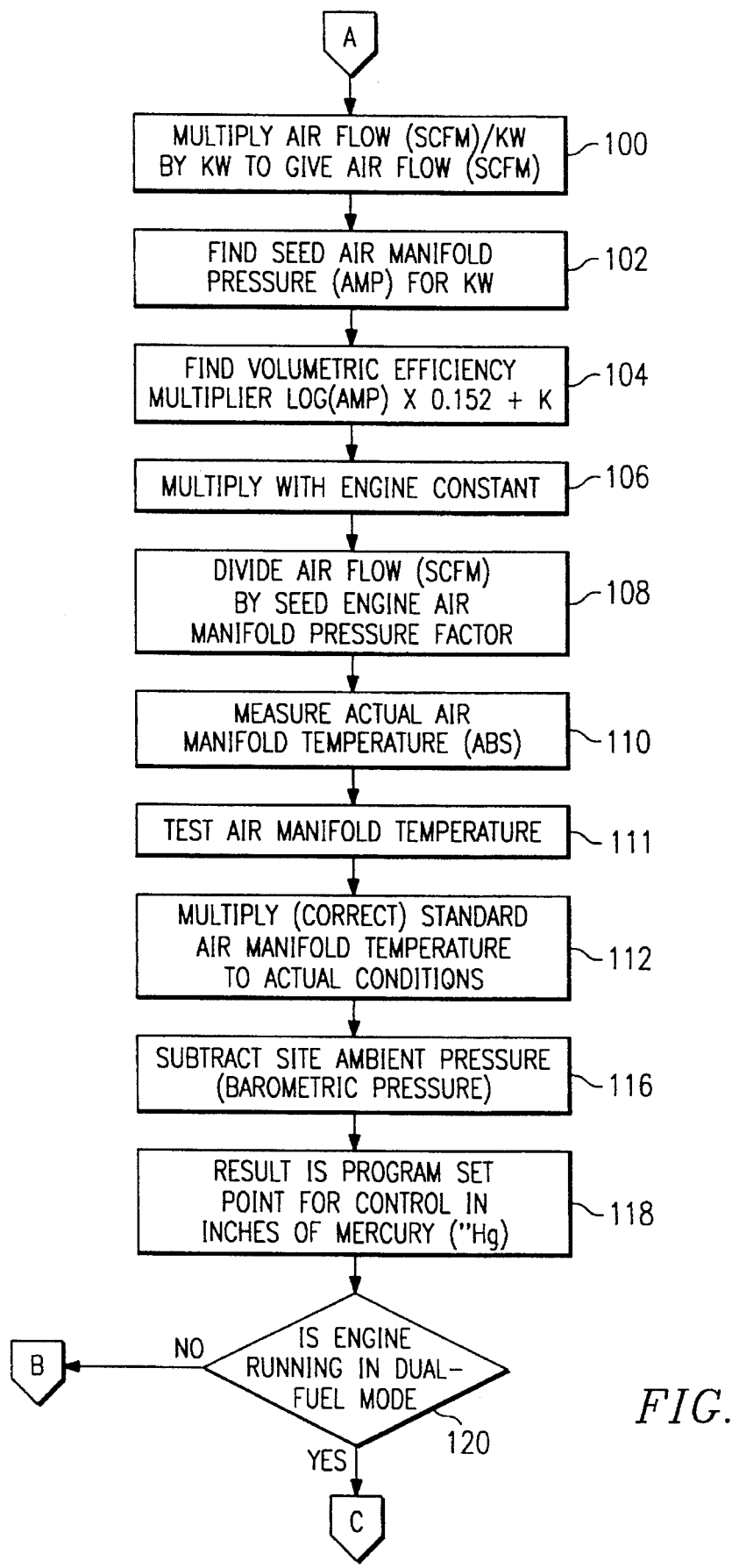
FIG. 4 is another portion of the more detailed flowchart of the air control process according to the present invention.
Figure 5:
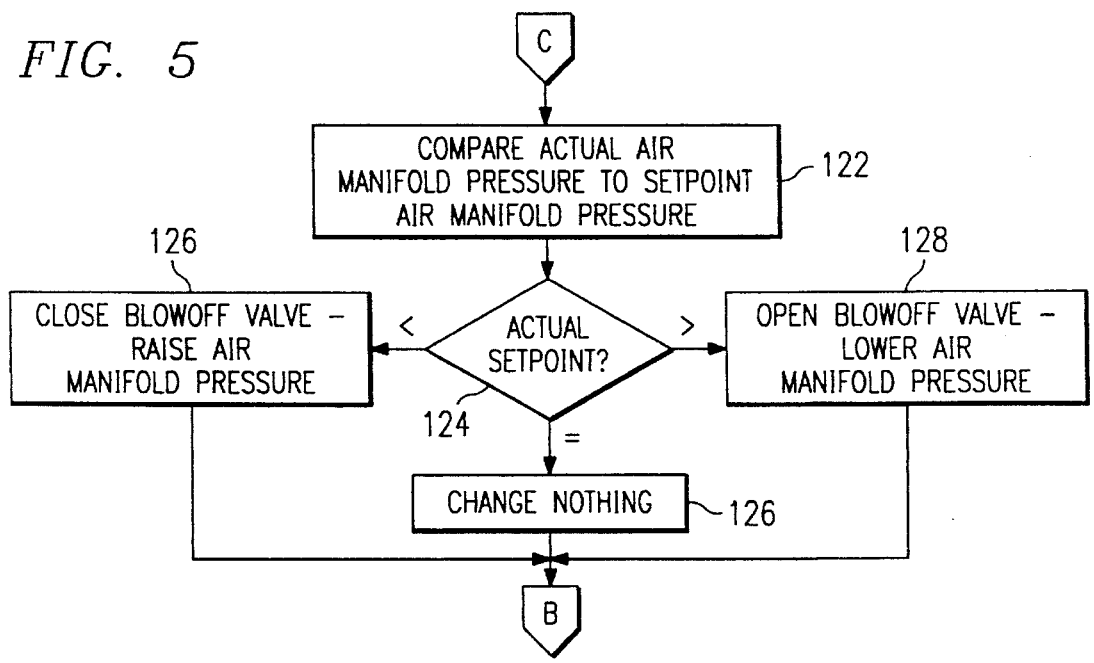
FIG. 5 is yet another portion of the more detailed flowchart of the air control process according to the present invention.

FIGS. 3–5 are more detailed flowcharts of the air control process according to the teachings of the present invention. The control process is based on an empirical equation that air flow to the engine is a function of the air manifold pressure, air manifold temperature, engine horsepower, and engine constant. Accordingly, the equation describes the relationship:

$$S = \frac{A}{1} \times \frac{B}{1} \times \frac{C}{D} \times E, \quad (1)$$

where S is air flow in Standard Cubic Feet per Minute (SCFM), A is an air manifold pressure conversion factor, B is an engine constant, C is the absolute air manifold pressure, D is the absolute air manifold temperature, and E is the exhaust oxygen content. Knowing the air flow and other values, the air manifold pressure, C, can be solved as described below.

In block 80 of FIG. 3, the engine or generator output is measured. The engine power output may sometimes be referred to as "engine load." The engine output is preferably either measured in kilowatts or converted to kilowatts. Conventional means of measuring or sensing engine output may be used to determine the engine output. The power output of some engines may not be directly measurable and may require sensing other engine operating parameters to calculate the engine output. In the case of a gas compressor engine, the horsepower required at the compressor can be found using the BWR equation (also known as the Benedict-Webb-Rubin equation) as known in the art. The measured engine output in kilowatts is preferably conditioned by computing for a moving average of a number of past measurements. For example, the present measurement is averaged with the past two measurements to ensure there is not a sudden large spike in the measured engine power output.

Figure 6:
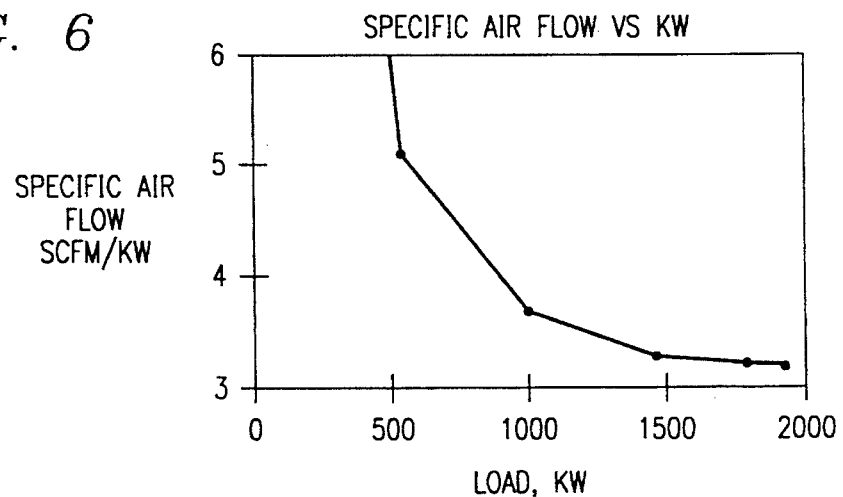
FIG. 6 is an exemplary plot of specific engine air flow versus engine load or output.

Subsequently in block 82, the conditioned engine output is entered into a specific air flow versus engine output curve shown in FIG. 6 to find the corresponding specific air flow in SCFM. The specific air flow versus engine output curve is preferably stored in a memory device (not shown) in controller 18. The specific air flow versus engine output curve may be determined by operating engine 12 in a preferred manner during engine characterization runs. During engine characterization runs, engine air flow in SCFM/KW, combustion air pressure and exhaust temperature are plotted against engine output in KW. In this manner, these engine operating parameters at various load points are calculated. If characterization runs on the particular engine are not possible, empirical data for the same type of engine may be used.

Figure 7:
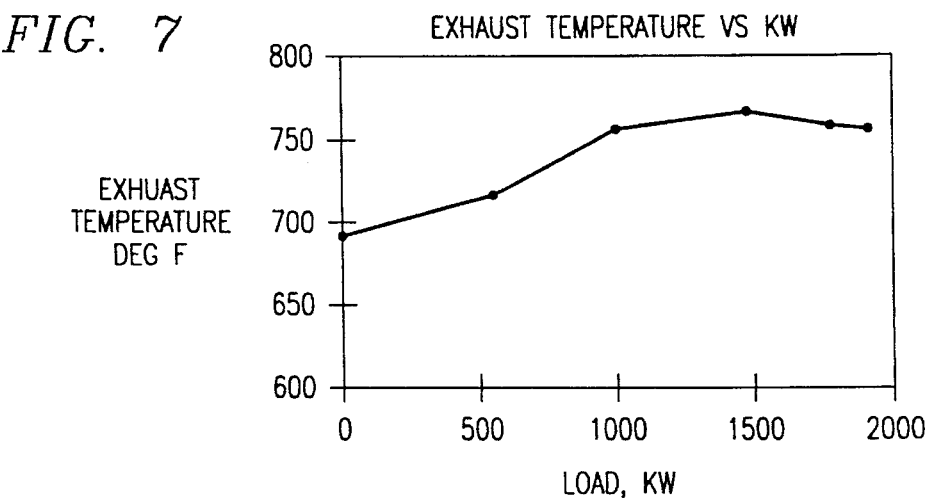
FIG. 7 is an exemplary plot of engine exhaust temperature versus engine load or output.
Figure 8:
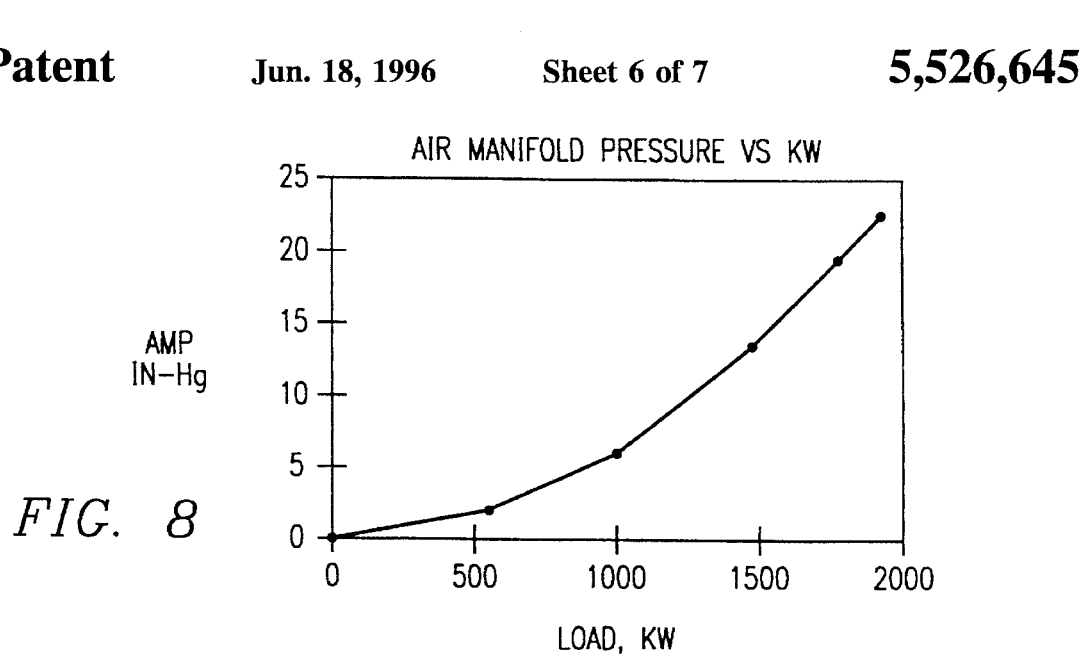
FIG. 8 is an exemplary plot of air manifold pressure versus engine load or output.

FIGS. 7 and 8 show typical exhaust temperature versus engine output and the air manifold pressure versus engine output curves, respectively. Because the air flow required with a cold engine is not the same as with a hot engine due to heat loss from the compressed charge to the cylinder walls at different rates. When the engine is cold, more heat of combustion and exhaust is lost to the colder metal parts as compared to a hot engine condition where the engine structure has stabilized, thermally. In a thermally stabilized condition, the rate of heat loss of the compressed charge and exhaust gases is fairly constant. This consistency can be a reliable indicator of engine thermal state. During the characterization tests, engine 12 is run through a load range and the engine exhaust temperature, specific air flow, and air manifold pressure recorded during these tests become the ideal settings with a thermally stable engine.

If during normal and thermally stable operations, the exhaust temperature increased, it is an indication that something has caused the heat load to be increased through the engine, such as a power factor drop. An increase in exhaust temperature almost always means a load increase has occurred, although the measured engine output may not have changed. The characterization curves helps to monitor and correct for this unexpected change, a relationship derived from the characterized tests. The engine characteristics typically do not change unless modification is made to the engine that affects its operation and changes the operating characteristics.

In addition to using the measured engine output, the control process also makes provision for entering a test kilowatt engine output for testing purposes as shown in block 81. Similarly, provisions are also made to enter a test specific air flow per engine output value for testing purposes as shown in block 83.

In block 84, a determination is made as to what the expected exhaust temperature should be based on the measured engine output and the exhaust temperature versus engine output curve shown in FIG. 7. For testing purposes, a test value for the exhaust temperature may be entered and used in computations instead of the plotted characteristic value as shown in block 85. The expected exhaust temperature is converted to absolute temperature by converting it to the Rankine temperature scale, where °R.=°F.+460. The actual exhaust temperature is then measured and converted to the Rankine scale, as shown in block 86. Note that the present invention is not limited to conversion to the Rankine scale to compute for absolute values, and other means of converting the temperature data to absolute measurements may also be used. Provisions are also made in the algorithm to enable an operator to calibrate the exhaust temperature sensor or thermocouple to ensure accurate measurements.

The exhaust temperature is compared to a low exhaust temperature limit in blocks 88 and 90. If the exhaust temperature is greater than the low exhaust temperature limit, then the measured value of the exhaust temperature is used in subsequent calculations, else the low temperature limit is used, as shown in block 94. In this manner, the higher of the measured exhaust temperature and the low temperature limit setting is used. Typically, the actual exhaust temperature is lower than the low temperature limit when the engine is just started. To prevent mistakenly decreasing the air flow to a dangerous level the low safety net temperature value is used to artificially set the exhaust temperature until the actual exhaust temperature surpasses the low limit. The imposition of this low exhaust temperature limit is primarily precautionary since the transfer from diesel to dual-fuel mode of operation is typically made after the engine has operated for some time and established a substantial "heat bed."

In block 92, the higher of the exhaust temperature values is used to calculate a ratio of actual exhaust temperature to the expect exhaust temperature obtained from the exhaust temperature versus engine output characterization curve to determine the level of deviation. The result is then smoothed preferably by calculating the square root thereof, as shown in block 96. The square root function dampens the excursion of the exhaust temperature ratio and avoids large variations thereof. The exhaust temperature correction is also described as a "nudging" function, which provides for very minor "nudging" corrections.

The smoothed value is then used to multiply with the standard specific air flow value per kilowatt (SCFM/KW) determined in block 82 to correct it for deviations caused by the exhaust temperature. This step compensates for any condition which affects the energy flow into the engine, such as generation power factor change, a change in generator efficiency, a change in fuel heating value and the like.

In block 100 shown in FIG. 4, the corrected standard specific air flow per kilowatt result of block 98 is then multiplied with the measured engine output to provide the required air flow in terms of SCFM. The air manifold pressure versus engine output curve shown in FIG. 8 is then consulted to obtain a "seed" air manifold pressure (AMP) for the measured engine output, as shown in block 102. The base 10 logarithm of the seed air manifold pressure is taken and multiplied by a constant 0.152. Another constant, K, is then added to the result, where K is 0.651 in the present computations. Therefore, $$A = (\text{LOG AMP} \times 0.1521 + 0.6514) \qquad (2)$$

where A is the air manifold pressure conversion factor in Equation (1) set forth above. The required air manifold pressure value obtained from the air manifold pressure versus engine output curve is a seed value used to shorten the iterative process required to compute for the absolute air manifold pressure. Any calculation error is insignificant since the calculation factor is a logarithm with a small range for any particular operating range of the engine, which is usually near unity. The calculation factor is sometimes called the volumetric efficiency offset, which indicates, for example, how well engine 12 is scavenging and the filling efficiency of the engine cylinders (not shown).

The result of the calculation in block 104 is then multiplied with an engine constant, as shown in block 106. The engine constant, B, is a value expressed in terms of cubic feet per minute of engine rotation and is dependent on a number of engine parameters, including engine bore size, piston strokes, number of cylinders, cylinder displacement, revolutions per minute (RPM) factor, engine compression ratio factor, standard temperature and pressure base, and expected exhaust oxygen level. For example, the engine constant, B, may be computed by:

$$B = \text{BORE}^2 \frac{\pi}{4} \times \frac{\text{STROKE}}{1728} \times \frac{\text{RPM}}{2} \times \frac{\text{NO. CYLS}}{1} \times 1 + \left(\frac{1}{CR}\right) \times 17.3333 \qquad (3)$$

The number 17.3333 represents the absolute temperature and pressure constant, and is computed by:

$$17.3333 = \frac{460° \text{ F.} + 60° \text{ F.}}{30'' \text{ Hg}} = \frac{520° \text{ R.}}{30} \qquad (4)$$

The result of the calculation in block 106 is the seed level engine air manifold pressure factor for the given conditions expressed in absolute terms. In block 108, the seed engine air manifold pressure factor is then used to divide the standard specific air flow in SCFM calculated in block 100.

The actual air manifold temperature is then measured and received by controller 18, as shown in block 110. The actual air manifold temperature is converted to absolute terms. This is also achieved by adding 460 to convert to the Rankine scale. Provisions are also made to allow an operator to enter a test actual air manifold temperature to be used instead of the measured data for testing purposes. In block 112, the absolute required air manifold pressure is corrected by taking the absolute air manifold temperature into account. The two values are multiplied.

Subsequently in block 116, the actual site barometric pressure (SBP) is determined and subtracted from the result from block 112 to compute for the corrected absolute air manifold pressure in gage terms. As shown in block 118, the result is the control set point or the target air manifold pressure in inches of mercury ("Hg) for the given engine operating condition.

The equation below is Equation (1) with the above computations substituted in place for the variables:

$$S = (\text{LOG AMP} \times 0.1521 + 0.6514) \times B \times \frac{|AMP|}{|AMT|} \times \left(1 + \left(\frac{O_2 \%}{100}\right)\right) \qquad (5)$$

Therefore, the specific engine air flow is equal to the modified logarithm of the air manifold pressure times an engine constant, times the absolute air manifold pressure over the absolute air manifold temperature, times a multiplier for the exhaust oxygen level. The exhaust oxygen level is related to the scavenging air flow of the engine.

Equation (5) can be used to find the required air manifold pressure when the target air flow in SCFM is known and by solving for AMP or the air manifold pressure. Rearranging Equation (5) to solve for AMP:

$$AMP = \frac{S}{(\text{LOG AMP} \times 0.1521 + 0.6514) \times B \times AMT \times \left(1 + \left(\frac{O_2 \%}{100}\right)\right)} - SBP \qquad (6)$$

or, $$AMP = \frac{S}{A \times B \times AMT \times E} - SBP \qquad (7)$$

using the variables, A, B, and E from Equation (1) and "SBP" is site barometric pressure. As discussed above, a seed AMP is used to expedite the computation. The AMP computed is the set point for the air manifold pressure or the target air manifold pressure.

In block 120, a determination is made as to whether engine 12 is operating in the dual-fuel mode. Recall this information is available as an operator input to engine panel 14 (FIG. 1). If engine 12 is operating in diesel fuel-only mode, then control returns to the beginning of the control flow or block 80 (FIG. 3). If engine 12 is operating in dual-fuel mode, then control proceeds to block 122 shown in FIG. 5.

In blocks 122 and 124, a comparison between the actual air manifold pressure and the set point or target air manifold pressure is made. Depending on the relationship between the two values, a different course of action is taken. If the actual air manifold pressure is equal to the set point value, then nothing is changed, as shown in block 126. On the other hand, if the actual air manifold pressure is less than the set point pressure, then air blowoff valve 50 (FIG. 1) is closed to raise the air manifold pressure, as shown in block 128. If the actual pressure is greater than the set point pressure, then air blowoff valve 50 is opened to lower the air manifold pressure. The process flow then returns to the beginning at block 80 (FIG. 3).

Constructed and operating in this manner, air blowoff valve 50 (FIG. 1) is controlled to provide the optimal air manifold pressure in the dual-fuel operating engine for the given conditions. A change in engine load or air manifold temperature results in a revised control setpoint. A change to the engine load other than kilowatts, for instance parasitic load, is experienced as an increase in exhaust temperature for which controller 18 makes the appropriate corrections in engine air flow for compensation.

Although not shown, provisions are also made in the control process to permit the operator to switch engine operations to a manual mode to override the computed set point pressure. This may be necessary at times to correct conditions which may cause improper operations, such as air line blockage, an input signal being lost or disconnected, some inclement weather conditions which may cause line bumps and engine output surges, and routine maintenance.

When engine 12 is operating as a generator driver and if the generator (not shown) is tied electrically to an infinite bus, then the generator output is indicative of the engine output. When operating as a gas fired engine, any change to combustion efficiency directly affects the engine power output. Increasing the combustion air supply to engine 12 downgrades combustion efficiency and causes less useful work to be derived from the power cycle, and as a result the engine power into the generator falls with a corresponding drop in generator output. The opposite is true if the air supply is lowered. Lowering the air supply improves combustion efficiency and results in more engine horse power available at the generator with a corresponding increase in generator output. Therefore, for a given fuel gas supply to the engine, the measure of combustion air supplied affects how efficiently energy of the fuel gas is converted to heat and ultimately horsepower from the engine. If the engine is locked "on line" with a constant fuel gas input, and the air manifold pressure is varied, the relationship between the engine output and applied air manifold pressure is shown in FIG. 9.

However in the control algorithm of the present invention, as the generator output is increased, the control process calls for an increase in air manifold pressure. Thus, the relationship between required air manifold pressure and measured engine output shown in FIG. 10 is exhibited.

Figure 9:
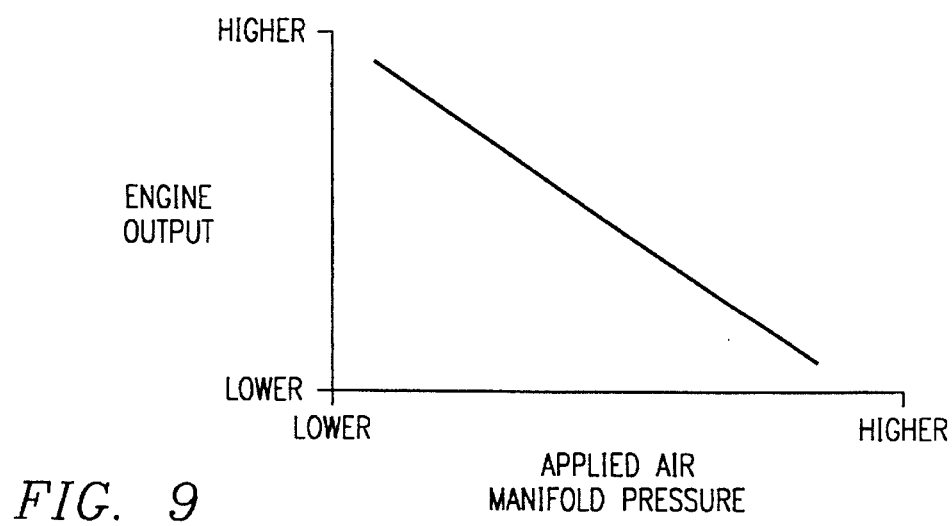
FIG. 9 is a plot showing the relationship between engine output and applied air manifold pressure with a constant fuel gas input.
Figure 10:
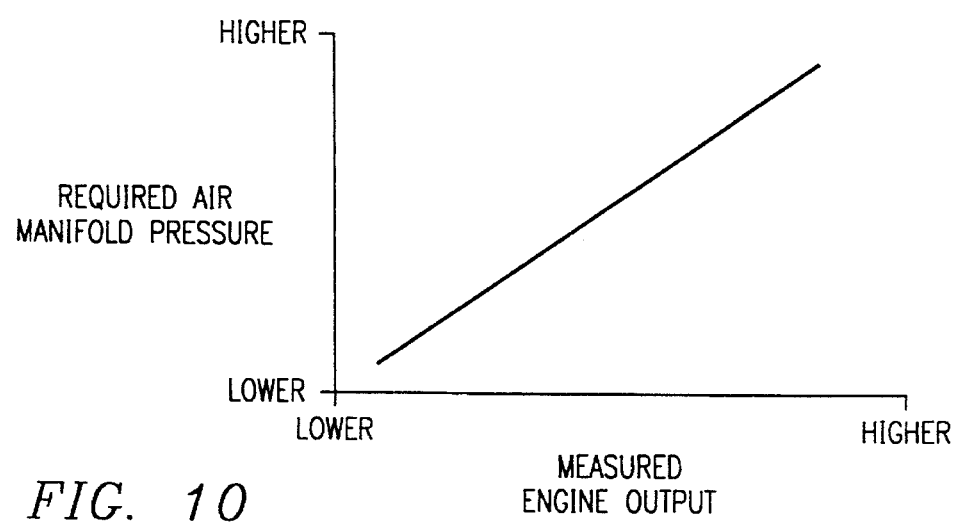
FIG. 10 is a plot showing the relationship between required air manifold pressure and measured engine output.
Figure 11:
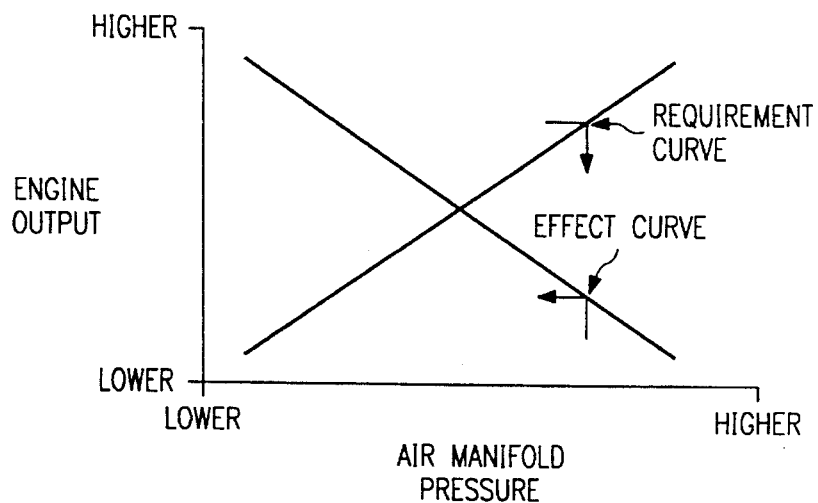
FIG. 11 is a plot showing the requirement curve and effect curve relationships between engine output and air manifold pressure.

The relationships in FIGS. 9 and 10 can be superimposed to derive the plot shown in FIG. 11. This plot shows that the effects of air manifold pressure and generator output as controlled by the control process of the present invention are self-compensating and autostabilizing.

Figure 12:
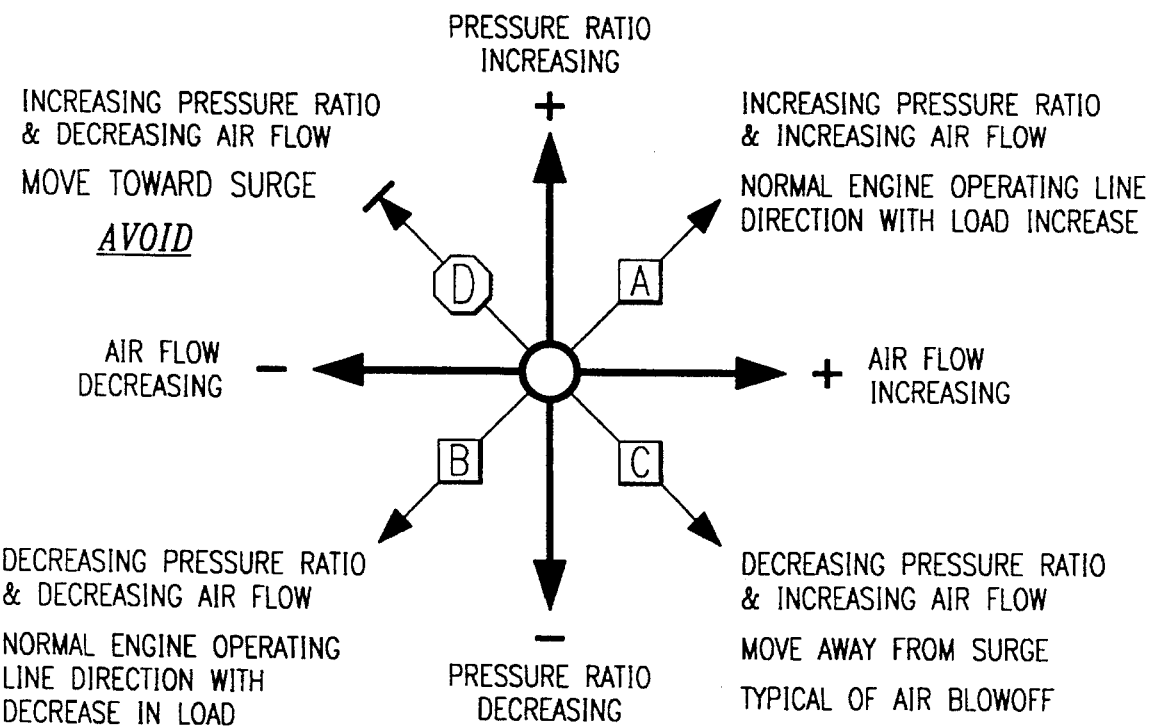
FIG. 12 is a plot of a surge compass showing centrifugal compressor surge tendencies vs. compressor pressure ratio and air flow rate.

Referring to FIG. 12, a further explanation of the principles underlying the teachings of the present invention is shown in the form of a surge compass. The surge compass illustrates compressor surge tendencies when the pressure ratio and air flow rate are changed. In quadrant A, the operational effect when the compressor pressure ratio is raised and the flow rate is increased is a surge tendency vector representing normal engine operations for increasing load. In quadrant B, the surge vector shows the effect of reduced compressor pressure ratio and reduced air flow rate. The vector in quadrant B represents normal engine operations for decreased load.

In quadrant C, the effects of reducing the compressor ratio and increasing air flow rate is to move away from the surge line. This explains why compressor blow off according to the present invention is the preferred means of engine air control for dual-fuel and spark ignition engines.

In quadrant D, when the compressor pressure ratio is increased with the air flow rate deceased, the surge vector is directed to the surge line. This condition explains why air manifold throttling is not a preferred engine air control technique unless coupled with compressor blow off.

Although the present invention and its advantages have been described in detail, it should be understood that various changes, substitutions and alterations can be made therein without departing from the spirit and scope of the invention as defined by the appended claims.

What is claimed is:

1. An excess air controller for controlling a dual-fuel internal combustion engine having a turbocharger, comprising:

a first temperature sensor mounted in an exhaust line of said engine adapted for sensing exhaust temperature;

a second temperature sensor mounted in an air manifold of said engine adapted for sensing air manifold temperature;

a pressure sensor mounted in said air manifold of said engine adapted for sensing air manifold pressure;

a transducer mounted on said engine adapted for sensing engine power output;

an air bypass line coupled between said air manifold and an air intake of said turbocharger;

a valve assembly coupled to said air bypass line adapted for permitting or prohibiting air to escape from said air bypass line; and a controller adapted to receiving said sensed exhaust temperature, air manifold temperature, air manifold pressure, and engine power output, calculating a target air manifold pressure, and comparing said target air manifold pressure with said measured air manifold pressure, and controlling said valve assembly in response to said comparison.

2. The excess air controller, as set forth in claim 1, further comprising an operator engine panel adapted to receiving operator input indicative of a selection between diesel and dual-fuel operating mode, and generating an operating mode input signal to said controller.

3. The excess air controller, as set forth in claim 1, further comprising:

an exhaust temperature versus engine output characterization curve;

a specific air flow versus engine output characterization curve;

an air manifold pressure versus engine output characterization curve; and said characterization curves being used to compute said target air manifold pressure.

4. The excess air controller, as set forth in claim 1, further comprising an exhaust temperature low limit setting used to compute said target air manifold pressure if said measured exhaust temperature is less than said low limit setting.

5. The excess air controller, as set forth in claim 1, wherein said valve assembly comprises:

a butterfly bypass valve coupled in-line with said air bypass line;

an air blowoff valve coupled to said butterfly bypass valve; and a pneumatic actuator coupled to said butterfly bypass valve and said air blowoff valve and being adapted to opening and closing said air blowoff valve.

6. The excess air controller, as set forth in claim 1, wherein said controller computes for said target air manifold pressure, AMP, such that:

$$AMP = \frac{S}{A \times B \times AMT \times E} - SBP$$

where S is a specific engine air flow, A is an air manifold pressure conversion factor, B is an engine constant, AMT is air manifold temperature, and E is an exhaust oxygen content and SBP is the site barometric pressure.

7. The excess air controller, as set forth in claim 1, wherein said controller computes for said target air manifold pressure, AMP, such that:

$$AMP = \frac{S}{(LOG\ AMP \times 0.1521 + 0.6514) \times B \times AMT \times E} - SBP$$

where S is a specific engine air flow, B is an engine constant, AMT is air manifold temperature, E is an exhaust oxygen content and SBP is the site barometric pressure.

8. An excess air control method for a dual-fuel or spark ignition gas internal combustion engines, comprising the steps of:

sensing exhaust temperature of said engine;

sensing air manifold temperature of said engine;

sensing air manifold pressure of said engine;

sensing engine power output of said engine;

computing for a target air manifold pressure, AMP, such that:

$$AMP = \frac{S}{A \times B \times AMT \times E} - SBP$$

where S is a specific engine air flow, A is an air manifold pressure conversion factor, B is an engine constant, AMT is said sensed air manifold temperature, E is an exhaust oxygen level and SBP is the site barometric pressure;

comparing said target air manifold pressure with said sensed air manifold pressure; and controlling an air blowoff valve coupled to an air manifold of said engine to achieve said target air manifold pressure.

9. The method, as set forth in claim 8, wherein the step of computing for a target air manifold pressure, AMP, includes the step of computing:

$$AMP = \frac{S}{(LOG\ AMP \times 0.1521 + 0.6514) \times B \times AMT \times E} - SBP$$

10. The method, as set forth in claim 8, further comprising the step of determining a specific engine air flow per kilowatt of engine output in response to said sensed engine power output and a specific air flow versus engine output characterization curve.

11. The method, as set forth in claim 8, further comprising the steps of:

determining a required air manifold pressure per kilowatt of engine output in response to said sensed engine power output and an air manifold pressure versus engine output characterization curve; and seeding said computation step with said determined required air manifold pressure per kilowatt of engine output.

12. The method, as set forth in claim 8, further comprising the step of determining an expected exhaust temperature per kilowatt of engine output in response to said sensed engine power output and an expected exhaust temperature versus engine output characterization curve.

13. The method, as set forth in claim 8, further comprising the steps of:

comparing said sensed exhaust temperature with a low temperature limit setting; and selecting a higher value of said sensed exhaust temperature and low temperature limit setting.

14. The method, as set forth in claim 8, further comprising the step of adjusting said target air manifold pressure with a site barometric pressure measurement (SBP).

15. The method, as set forth in claim 8, further comprising the steps of:

receiving an operator input indicative of diesel fuel-only operating mode or dual-fuel operating mode; and changing said blowoff valve setting only if said engine is operating in dual-fuel operating mode.

16. The method, as set forth in claim 8, further comprising the steps of receiving a test engine power output for said computation step.

17. The method, as set forth in claim 8, further comprising the steps of receiving a test air manifold pressure for said computation step.

18. The method, as set forth in claim 8, further comprising the steps of receiving a test air manifold temperature for said computation step.

19. The method, as set forth in claim 8, further comprising the steps of receiving a test exhaust temperature for said computation step.

20. The method, as set forth in claim 8, further comprising the step of converting all temperature values to an absolute scale.

21. The method, as set forth in claim 8, wherein said air blowoff valve controlling step includes the steps of:

closing said air blowoff valve to raise said air manifold pressure; and opening said air blowoff valve to lower said air manifold pressure.

22. An excess air control method for a dual-fuel internal combustion engine, comprising the steps of:

sensing exhaust temperature of said engine;

sensing air manifold temperature of said engine;

sensing air manifold pressure of said engine;

sensing engine power output of said engine;

computing for a target air manifold pressure in response to said sensed exhaust temperature, air manifold temperature and pressure, and engine power output;

comparing said target air manifold pressure with said sensed air manifold pressure; and controlling an air blowoff valve coupled to an air manifold of said engine to achieve said target air manifold pressure.

23. The method, as set forth in claim 22, wherein the step of computing for a target air manifold pressure, AMP, includes the step of computing:

$$AMP = \frac{S}{A \times B \times AMT \times E} - SBP$$

where S is a specific engine air flow, A is an air manifold pressure conversion factor, B is an engine constant, AMT is said sensed air manifold temperature, E is an exhaust oxygen level and SBP is the site barometric pressure.

24. The method, as set forth in claim 23, wherein the step of computing for a target air manifold pressure, AMP, includes the step of computing:

$$AMP = \frac{S}{(\text{LOG } AMP \times 0.1521 + 0.6514) \times B \times AMT \times E} - SBP$$

25. The method, as set forth in claim 22, further comprising the step of determining a specific engine air flow per kilowatt of engine output in response to said sensed engine power output and a specific air flow versus engine output characterization curve.

26. The method, as set forth in claim 22, further comprising the steps of:

determining a required air manifold pressure per kilowatt of engine output in response to said sensed engine power output and an air manifold pressure versus engine output characterization curve; and seeding said computation step with said determined required air manifold pressure per kilowatt of engine output.

27. The method, as set forth in claim 22, further comprising the step of determining an expected exhaust temperature per kilowatt of engine output in response to said sensed engine power output and an expected exhaust temperature versus engine output characterization curve.

28. The method, as set forth in claim 22, further comprising the steps of:

comparing said sensed exhaust temperature with a low temperature limit setting; and selecting a higher value of said sensed exhaust temperature and low temperature limit setting.

29. The method, as set forth in claim 22, further comprising the step of adjusting said target air manifold pressure with a site barometric pressure measurement.

30. The method, as set forth in claim 22, further comprising the steps of:

receiving an operator input indicative of diesel fuel-only operating mode or dual-fuel operating mode; and changing said blowoff valve setting only if said engine is operating in dual-fuel operating mode.

31. The method, as set forth in claim 22, further comprising the steps of receiving a test engine power output for said computation step.

32. The method as set forth in claim 22, further comprising the steps of receiving a test air manifold pressure for said computation step.

33. The method, as set forth in claim 22, further comprising the steps of receiving a test air manifold temperature for said computation step.

34. The method, as set forth in claim 22, further comprising the steps of receiving a test exhaust temperature for said computation step.

35. The method, as set forth in claim 22, further comprising the step of converting all temperature values to an absolute scale.

36. The method, as set forth in claim 22, wherein said air blowoff valve controlling step includes the steps of:

closing said air blowoff valve to raise said air manifold pressure; and opening said air blowoff valve to lower said a manifold pressure.

* * * * *